(No Model.)
C. L. REGESTER.
NECK YOKE FASTENER.
No. 438,562. Patented Oct. 14, 1890.
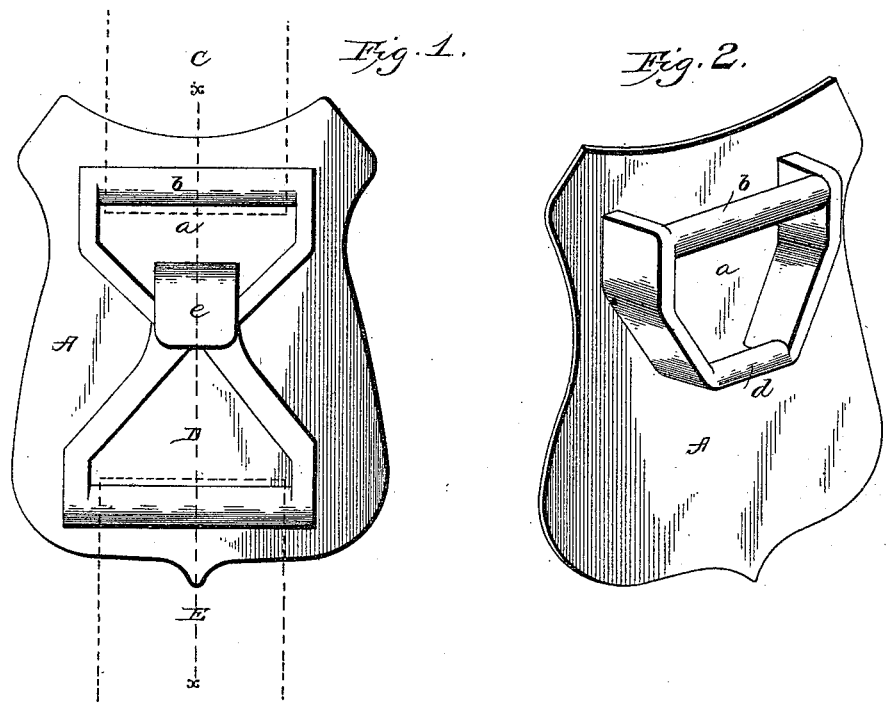
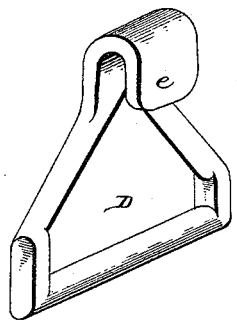
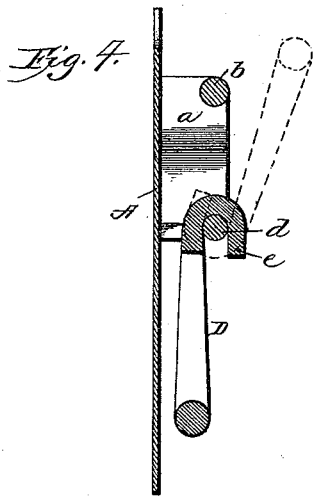
WITNESSES
Franck L. Durand
Van Buren Hillyard
INVENTOR
Charles L. Regester.
By R. S. & A. P. Lacy
Attorneys

UNITED STATES PATENT OFFICE.

CHARLES LINCOLN REGESTER, OF TEKAMAH, NEBRASKA.

NECK-YOKE FASTENER.

SPECIFICATION forming part of Letters Patent No. 438,562, dated October 14, 1890.

Application filed August 4, 1890. Serial No. 360,935. (No model.)

*To all whom it may concern:*

Be it known that I, CHARLES LINCOLN REGESTER, a citizen of the United States, residing at Tekamah, in the county of Burt and State of Nebraska, have invented certain new and useful Improvements in Neck-Yoke Fasteners; and I do hereby declare the following to be a full, clear, and exact description of the invention, such as will enable others skilled in the art to which it appertains to make and use the same.

This invention relates to fasteners, and aims to provide a simple device for securing the neck-yoke straps to the collar, and which will admit of instantaneous attachment and detachment of the said straps from the collar. The said fastening will also serve as an ornament pending from the collar and will prevent injurious contact of the neck-yoke strap with the horse's breast.

The improvement consists of the fastening, which will be hereinafter more fully described and claimed, and which is shown in the annexed drawings, in which—

Figure 1 is a front view of the fastening, the collar and neck-yoke straps being shown by dotted lines. Fig. 2 is a perspective view of the base-plate. Fig. 3 is a perspective view of the loop having a hook at its upper end. Fig. 4 is a vertical section on the line X X of Fig. 1, showing the operation of the loop by dotted lines.

The base-plate A, which is suspended from the collar, may be of any desired shape, and has the loop $a$ at its upper end integrally formed therewith, the plate and loop being cast together. The upper cross-bar $b$ of the loop receives the strap C, which connects the fastener with the collar. The lower end of the loop is contracted, and the lower cross-bar $d$ is designed to receive the loop D, which is secured to the neck-yoke strap E. The loop D is wide at its lower end and contracted at its upper end, which end is fashioned into the hook $e$. The base-plate A is sufficiently large to permit the loop D to rest against it and have a margin around the edges of the loop.

In practice base-plate A is suspended from the collar (not shown) by the strap C, and the loop D is secured to the neck-yoke strap.

To fasten loop D to base-plate A, it is turned in about the position shown by dotted lines in Fig. 4 and engaged with the cross-bar $d$ and turned down. The weight of the neck-yoke and strap prevents the loop D from swinging up so as to become disengaged from the loop $a$.

To disengage loop D from base-plate A, the loop is turned up to about the position shown by dotted lines in Fig. 4, when it can be readily detached.

Having thus described my invention, what I claim, and desire to secure by Letters Patent, is—

The hereinbefore-specified neck-yoke fastener, composed of the base-plate A of fanciful design, having loop $a$ at its upper end integrally formed therewith, the loop $a$, having upper cross-bar $b$ and contracted at its lower end, and having lower cross-bar $d$, and the loop D, having hook $e$ at its upper end, which hook is designed to engage with the cross-bar $d$, substantially as set forth.

In testimony whereof I affix my signature in presence of two witnesses.

CHARLES LINCOLN REGESTER.

Witnesses:
CHAS. K. OTT,
S. A. HOON.